United States Patent [19]
Madigan et al.

[11] 3,853,990
[45] Dec. 10, 1974

[54] INFECTIOUS KERATING BACTERIN AND ANTISERUM AND METHOD OF PREPARING SAME

[76] Inventors: Edward J. Madigan, 4800 W. 31st Ave., Mark M. Ruszczycky, 4810 W. 31st Ave., both of Denver, Colo. 80212

[22] Filed: July 13, 1973

[21] Appl. No.: 378,831

Related U.S. Application Data

[63] Continuation of Ser. No. 325,445, Jan. 22, 1973, abandoned, which is a continuation-in-part of Ser. No. 232,282, March 6, 1972, abandoned.

[52] U.S. Cl. .................................. 424/87, 424/92
[51] Int. Cl. ........................................ A61k 23/00
[58] Field of Search .............................. 424/87, 92

[56] References Cited
UNITED STATES PATENTS

| | | | |
|---|---|---|---|
| 3,197,373 | 7/1965 | Jackson | 424/92 X |
| 3,401,219 | 9/1968 | Zeissig | 424/92 X |

OTHER PUBLICATIONS

Wilcox, G.E., Vet. Bull. 38(6): 349–360, June 1968, "Infectious Bovine Kerato-Conjunctivitis A Review."

Pugh, G. W., Diss. Abstr. 30B: 2825–2826, (1969), "Characterization of Moraxella Bovis and its Relationship to Bovine Infectious Keratoconjunctivitis."

Moreno, G. et al., Arqs. Inst. Biol., S. Paulo, 36:183–189, (1969), "Moraxella Bovis, Microbiological Aspects."

Hughes, D. G. et al., J. Am. Vet. Med. Ass., 157:443–451, (1970), "A Five Year Study of Infectious Bovine Keratoconjunctivitis in a Beef Herd."

*Primary Examiner*—Shep K. Rose

[57] ABSTRACT

A bacterial vaccine and antiserum together with a method preparing same has been discovered for the long term prevention by immunization against infectious keratitis and the treatment of the disease in livestock where in accordance with the present invention the vaccine comprises an inactivated pooled cutlure composition composed of *Moraxella bovis* and selected strains of *Pasteurella multocide* and Corynebacterium, and the antiserum comprises serum from the defibrinated blood of cattle which have been successively immunized and hyperimmunized against these same strains; and further wherein the *Pasturella multocida* strains are *Pasturella bubalseptica, Pasturella boviseptica* and *Pasturella oviseptica,* and the Corynebacterium strains are *Corynebacterium pyogenes, Corynebacterium pseudodiphthericum* and *Corynebacterium pseudotuberculosis.*

13 Claims, No Drawings

INFECTIOUS KERATING BACTERIN AND ANTISERUM AND METHOD OF PREPARING SAME

This application is a continuation of Ser. No. 325,445, filed Jan. 22, 1973, which in turn is a continuation in part of Ser. No. 232,282 filed Mar. 6, 1972, both applications now abandoned.

This invention relates to bacterial vaccine (bacterin) for long term preventive inoculation of livestock against infectious keratitis, commonly known as pink-eye, and an antiserum for the treatment of outbreaks of the disease, as well as the method of preparing the bacterin and antiserum.

Infectious keratitis is an infectious disease of cattle and other animals which is characterized by photophobia, lacrimation, conjunctivitis and varying degrees of corneal opacity and ulceration. It is also known by a number of other names including infectious keratoconjunctivitis and infectious ophthalmia.

The disease occurs suddenly in the initially infected animal and tends to spread rapidly. Dry, dusty environmental conditions, feeding in tall grass, the presence of large numbers of flies or gnats, eating and drinking or crowding together in barns or corrals are all suspected to result in propagation of the disease. Proportionally, more younger animals than older ones are affected. Sunlight tends to aggravate the disease, and the animal seeks shade to relieve the pain. The appetite becomes depressed, and in dairy cattle, milk production decreases significantly.

The initial signs of the disease are photophobia and excessive lacrimation which tends to stain the hair, followed by mucopurulent discharge from the eye. The infection may appear in one or both eyes. If the infection is mild, it will usually disappear within a few days. Most commonly, however, the disease is acute and results in a white or gray spot on the cornea which develops to a pimple-like proturberance and many become ulcerated. The lesions vary in severity from a mild conjunctivitis to ulcerative keratitis with resultant penetration of the anterior chamber. The conjunctival vessels become hyperemic and prominent. In cattle, the corneal opacity may involve a small area or all of the corneal surface, part or all of which may ulcerate. In other animals, a small ulcer(s) may occur near the center of the cornea, or less often, closer to the limbus without initial notable corneal discoloration. Shortly thereafter, the ulcers are surrounded by an opaque ring of varying thickness due to corneal edema and leucytic infiltration. Regression may occur in the early stages or the lesions may continue to progress with attendant secondary bacterial infection. Continual active ulceration may cause rupture of the cornea. In chronic cases, the corneal lesions either regress over a long period or the cornea is permanently scarred. In neglected cases, the animal may die from extension of the infection to the brain or generalize bacteremia. Rapid response to treatment for severe corneal ulceration cannot be expected, and recovered animals often become carriers. Immunity under field conditions has in the past been somewhat variable and short term. Although immunity can be produced against some viral agents known to infect the eye, there has been no reliable vaccine against infectious keratitis.

In the prior art, it has been suggested that herds benefit from the prophylatic use of a bacteria containing *Pasteurella boviseptica, Corynebacterium pyogenes, Micrococcus aureus,* and *Micrococcus albus* administered subcutaneously in increasing dosages at one week intervals over a 3-week period. However, while such bacteria may afford some protection, it is not a preventative.

It is an objective of this invention to provide a novel vaccine for long term immunization of livestock against infectious keratitis.

It is also an object of this invention to provide a novel and improved antiserum which is extremely effective in the treatment and subsequent prevention of infectious keratitis outbreaks in animals generally and in particular livestock such as cattle.

It is a further object of this invention to provide a novel and improved method of preparing the respective bacterin and antiserum.

Other objects of this invention will become apparent from the following specification and claims.

It has now been found that livestock, and specifically cattle, can be immunized for periods in excess of 6 months against infectious keratitis by inoculation with the inactivated bacterial vaccine (bacterin) hereinafter described, and that outbreaks of the disease can be treated and brought under control through injections of an antiserum prepared from the defibrinated blood of cattle which have been immunized with the inactivated bacterin and thereafter hyperimmunized with live, pure cultures of the same bacterial composition.

The bacterin is prepared from selected bacteria and strains thereof. The bacterin composition comprises a mixture of pooled bacterial cultures, which have been grown in a liquid medium and then inactivated or killed through the addition of formaldehyde, prepared in the following proportions:

1. Sixty-five percent *Pasteurella multocida* bacteria strains selected from the group consisting of *Pasteurella bubalseptica, Pasturella boviseptica, Pasturella oviseptica* and admixed in approximately equal parts by volume;
2. Twenty-five percent Corynebacteria selected from the group consisting of *Corynebacterium pyogenes, Corynebacterium pseudotuberculosis,* and *Corynebacterium pseudodiphtherium* and admixed in approximately equal parts by volume, and
3. Ten percent *Moraxella bovis.*

The *Pasteurella multodcida* and Corynebacteria strains, as well as the Moraxella bovis bacteria are well-known organisms, and can be identified by the characteristics described below.

The pink-eye antiserum is obtained from the blood of cattle, usually 1.5 to 2.0 years of age, that have been first immunized with the killed or inactivated bacteria of this invention, and then hyperimmunized beginning about 1 week thereafter with 5.0 ml of live, pure immunization cultures produced as hereinafter described. The procedure for obtaining antiserum will be discussed in greater detail below.

Pasteurella Multocida

*Pasteurella multocida* organisms are bipolar gram-negative coccoids, short rods and sometimes elongated. Their size varies from 0.2 to 0.4 microns by 0.6 to 2.0 microns. They are capsulated, non-motile and non-spore forming. They are readily obtained from animals just after death, and when stained with methylene blue show stain more distinctly at opposite ends or poles.

The organism is an aerobe and facultative anaerobe. The optimum temperature for its growth in an artificial medium is 37°C. at a pH of from 7.2 to 7.4. The use of digested protein media or proteose peptone stimulates its growth. It may be grown in an infusion medium such as beef extract although improved growth is obtained by adding blood or blood serum to the medium.

*Pasteurella multocida* is readily destroyed by heating to 60°C for about 10 minutes or admixing it with an 0.5 percent phenol solution for about 15 minutes. The organism remains infective in manure for about 1 month and in decomposing carcasses for 3 months. The organism is difficult to keep alive in an artificial medium for any substantial time and it loses its virulence quickly. Its virulence can usually be restored by animal passage. The organism is sensitive to all of the commmonly used antibiotics.

*Pasteurella multocida* is pathogenic for many different animals and particularly white mice and rabbits. The acute infections caused by this organism are characterized by a septicemia that is frequently accompanied by blood-vascular congestion, submucous and subserous hemorrhages and an enteritis. In cattle hemorrhagic septicemia occurs in either the pectoral or edematous form. The pectoral form involves the lungs and the pleural cavity, and is usually accompanied by petechial hemorrhages in those tissues. The edematous type appears as an extensive edema of subcutaneous tissues and the organs and tissues of the peritoneal cavity. It may also be located in various other tissues such as the eye or brain.

The *Pasteurella multocida* organism is encountered throughout the world and is frequently the cause of great economic loss. Since typical organisms have been isolated from respiratory and digestive tracts of normal animals, the primary relationship of the organism to the disease has been doubted frequently. These organisms may act as secondary invaders to other diseases or to predisposing factors. The occurrence of epizootics and sporadic outbreaks may indicate that these organisms can acquire virulence while being harbored in the animal, since the nature of these organisms requires continual parasitism for existence.

Corynebacterium

Three types of Corynebacteria are required in preparing the bacterin and hyperimmunizing culture, and they are generally added in approximately equal parts by volume.

*Corynebacterium pyogenes* is a small, coccoid pleomorphic rod which varies in length from 0.5 to 2.0 microns and in breadth 0.2 to 0.3 microns. Cells with swollen and pointed ends are common. The organisms are usually single but show a decided tendency to form clumps. It is non-motile, non-capsule producing, Gram-positive and aerobic. The optimum temperature for growth is 37°C at a pH of 7.0–7.2. On serum agar or blood agar the organism forms minute dewdrop-like colonies which with age become opaque and dry. In a liquid medium the organism forms a light, powdery sediment. It can usually be found in abscesses in cattle, swine and other warmblooded animals.

*Corynebacterium pseudodiphthericum* is a rod having round ends which varies in size from 0.3 to 0.5 microns by 0.8 to 1.5 microns. It is fairly uniform in size and without swollen ends. The organism is aerobic and Gram-positive and generally non-pathogenic for animals. The optimum temperature for its growth in an artificial medium is 37°C at a pH of 7.0–7.2.

*Corynebacterium pseudotuberculosis* is a slender rod which varies in size from 0.5 to 0.6 microns by 1.0 to 3.0 microns. When the organism is stained, the staining is irregular and shows clubbed forms. The organism is non-motile and Gram-positive. The optimum temperature for its growth is 37°C at a pH of 7.0–7.2. It is often found in caseous lymphadenitis in sheep and in ulcerated lesions in horses, cattle and other warm-blooded animals.

Each of the above Corynebacteria is very sensitive to penicillin and can be readily destroyed by heating it to 75°C.

Moraxella Bovis (*Hemophilus Bovis*)

This organism is a Gram-positive, aerobic, non-spore forming short rod which varies in size from 0.5 to 1.0 microns by 1.5 to 2.0 microns. It is usually found in pairs, but short chains are frequently observed. In young cultures the organism has a definite capsule. This organism is most satisfactorily grown in horses or cattle blood agar at 37°C and a pH of 7.2 to 7.3. When the organism is grown in this manner, it forms small, round, translucent, grayish-white colonies that are surrounded by a narrow zone of hemolysis. It can also be grown in nutrient borth wherein it forms a lightly turbid and coarse sediment. This particular organism is not pathogenic to laboratory animals and can be destroyed easily by heating it to a temperature of 60°C for 5 minutes. The organism is readily isolated from acute cases of infectious keratitis in cattle.

Bacterin and Culture Preparation

In order to provide stock cultures, seed cultures, bacterin production cultures, and hyperimmunizing cultures, the bacteria are first grown in a medium containing 10 grams of beef extract, 10 grams of bacto peptone and 5 grams of sodium chloride per 1000 ml of distilled water. The ingredients are dissolved in the water upon heating to 100°C and adjusting the pH to between about 7.5 and 7.6. The medium should be filtered. It is desirable that prior to the filtering operation, the medium is heated to about 120°C. for 20 to 30 minutes to avoid precipitates in the final product. The filtered medium is then dispensed in flasks or other large containers in preparation for growing both bacterin production cultures and hyperimmunizing cultures. Seed culture media is generally dispensed in test tubes. The dispensed medium is autoclaved at 121°C for 20 minutes and its pH determined. The final pH should be 7.2 to 7.3. When the medium is used to grow and maintain stock cultures, 1.5 weight percent agar powder is added prior to the autoclaving.

Stock cultures must be periodically renewed. To prepare the stock cultures, the autoclaved media, described above, is cooled to 40°C. Sterile and defibrinated blood of bovine or sheep origin is added to the medium in an amount of from 5 to 10 volume percent, mixed gently with the medium and dispensed into test tubes or Petri dishes. The tubes are tipped or slanted to produce a surface for seeding of bacteria after the medium has solidified. A small amount of bacteria is seeded on the surface of the blood agar medium and incubated for 20 to 24 hours at 37°C. A separate tube or dish is used to incubate each bacterial strain. After incubation, the stock cultures are maintained in a cooler at 4°–5°C. Every 10 to 15 days, new stock cultures must be prepared in the same manner to assure that the cultures remain alive and antigenic.

Seed culture must, unlike the stock cultures, be prepared fresh each time. To prepare the seed cultures, a small amount of each bacteria is transferred from the stock culture tube to tubes containing liquid medium. After an incubation period of 20 to 24 hours at about 37°C, the seed cultures are then used to inoculate bacterin production media and/or hyperimmunizing media.

In preparing bacterin production cultures and hyperimmunizing cultures, one test tube of seed media of each bacterial strain is added to a large flask. (1–4 liter capacity) containing bacterin production media or hyperimmunizing media. The bacterin production cultures are then grown for 18 to 20 hours at 37°C, while the hyperimmunizing cultures are grown for 20 to 24 hours at 36°–37°C. Each of the strains is grown separately. When the growth of the various bacterial strains is satisfactory and no contamination with undesired organisms is present, the cultures are pooled in one container according to the formulation set forth above, that is, 65 volume percent *Pasteurella multocida*, 25 volume percent Corynebacteria and 10 volume percent *Moraxella bovis*. As previously discussed, the live pooled cultures are used in the hyperimmunization procedure, while the immunization procedure utilizes killed cultures.

The pooled bacterin production cultures and immunization cultures are killed or inactivated through the addition of a 37 percent formaldehyde solution to a final concentration of from 0.3 to 0.5 volume percent formaldehyde. The inactivated cultures are thereafter tested for inactivation in a blood agar medium and fluid thioglycollate medium. If the inactivated culture is to be used as the bacterial vaccine of this invention, the inactivated culture are maintained at room temperature for about 4 hours and then placed in a cooler for several (4 – 5) days prior to testing for proper inactivation as below described. Upon testing for proper inactivation of the bacterin, if no growth appears within 14 days of the incubation at 37°C in an incubator, and also for a like period of 20°C to 22°C outside of an incubator, the cultures are considered inactivated or killed and ready to be utliized as the bacterin in the immunization procedure. On the other hand, if the inactivated culture is to be used in the immunization procedure described below for the production of the pink-eye antiserum, the inactivated cultures are maintained at room temperature for 24 hours and then tested for inactivation using the blood agar medium. In this latter case, if no growth appears within 72 hours of the incubation, the cultures may be considered inactivated. The purpose of the extended incubation period of 14 days is to allow sufficient time to be positive that the bacterin cultures have been properly inactivated; that they are not virulent, but possess the ability to produce immunity against pink-eye infection within two to three weeks following inoculation. Inoculation is advisedly conducted every 6 months using a dosage of 20 ml per animal injected subcutaneously.

It is desirable to periodically prove the potency of the bacterin in white mice. This potency test is accomplished by subcutaneously injecting white mice weighing 18–20 grams each with 0.3 ml of the bacterin twice 7 to 10 days apart. Twenty-one days after the first inoculation 80 percent of the vaccinated mice should survive when injected with 0.6 ml of the same live, virulent bacteria. Control mice which have not been protected with the bacteria should die within 7 days after being injected with the same dosage, i.e. 0.6 ml, of live bacterin. Eighty percent mortality is expected in the control mice. Further, the control mice will die even if the live bacteria is diluted 1000 times as compared to that used to challenge vaccinated mice.

Pink-eye Antiserum and Its Preparation

The pink-eye antiserum is prepared from the defibrinated blood of cattle which have been immunized and hyperimmunized against *Moraxella bovis* and strains of *Pasteurella multocida* and Corynebacterium. As previously pointed out, the cattle are first immunized with the killed immunizing culture described above and then hyperimmunized beginning about 1 week thereafter with 50 ml of *Corynebacterium Pasteurella* antiserum (available commercially) and 5 ml of the live *Pasteurella multocida*, Corynebacterium and *Moraxella bovis* hyperimmunizing pooled cultures prepared as hereinafter described. The immunization with killed cultures is conducted by successive subcutaneous injections in 3 to 7 day intervals of 20 ml, 40 ml, 60 ml, 80 ml and 100 ml doses. The hyperimmunization is begun 1 week after the last injection of killed cultures by subcutaneously injecting separately into a first part of the animal 50 ml of Corynebacterium Pasteurella antiserum and 5 ml of live pooled cultures into a second part of the animal's body remote from the first part. For example, the Corynebacterium Pasteurella antiserum may be injected into the neck of the animal and the live cultures injected into the shoulder area. After the initial hyperimmunizing injection is carried out, subsequent hyperimmunization is continued in one-week intervals with increased doses of 10 ml, 20 ml, 40 ml, 60 ml, 80 ml, 100 ml, 125 ml and 150 ml of live culture respectively. The last dose is repeated in 1 week intervals for as long as the produced serum shows a satisfactory titer. Usually, after 14 weeks of immunization and hyperimmunization, the serum will show a satisfactory titer and the collection of antiserum may be started.

The antiserum obtained from hyperimmunized cattle must show a satisfactory titer when subcutaneously injected into white mice. The titer of the antiserum is considered satisfactory when 50 percent of the white mice weighing on the order of 18 to 20 grams survive for about 7 days (168 hours) after being injected subcutaneously with 0.005 ml of the serum and 0.5 ml of fresh and virulent *Pasteurella multocida* culture having a concentration of 0.001 ppm of the culture (a dilution of 1:1000) within 24 hours after the antiserum injection. The serum is injected into the body at a location remote from that injected with the *Pasteurella multocida* culture. Additionally, the same amount of *Pasteurella multocida* culture, used for testing mice, must kill control mice, i.e, those mice not injected with the antiserum, within 72 hours after the subcutaneous injection.

The antiserum is obtained from the blood which may be collected every 10 to 14 days, provided, however, that 7 days before each collection, the cattle have been hyperimmunized with 150 ml of freshly prepared, live pooled culture. The blood is obtained by bleeding the cattle from the jugular vein into a sterile container. During the bleeding, the blood is defibrinated by mixing in a mechanical agitator. Approximately 5 to 6 ml of blood may be obtained for every pound of body weight, i.e., a 1200 pound animal may yield 16 pounds of blood, without injuring the animal. Thereafter, the container with blood is placed in an ice water bath for 1 to 2 hours. The blood is then strained and the serum separated from the cells by passing through a separator, i.e. cream separator, and collected in sterile containers for subsequent pasteurization. During the pasteurizing process, the temperature should be maintained at about 58.5°C. After pasteurization, preservatives are added as follows: 7.5 volume percent phenol to a final concentration of 0.5 volume percent and "Merthiolate" to a final concentration of 0.01 volume percent.

The prepared antiserum must be maintained in a cooler. If it shows contamination, sterilization by filtering, i.e., a Seitz filter, will remove the bacteria. If the serum is sterile, it is tested for potency, safety and purity prior to bottling. Potency tests which must show a satisfactory titer as described are performed in white mice, safety tests are performed on guinea pigs and purity tests are performed in an artificial media. The safety and purity tests are performed according to those prescribed by the U.S. Department of Agriculture Veterinary Biological Division.

Recommended dosages for pink-eye treatment are 30 to 60 ml of antiserum, depending on the size of the animal, injected subcutaneously. In refractory cases, this amount may be repeated at any time.

The antiserum, prepared as described above, was successfully field-tested in two different herds: One herd contained 27 cattle with pink-eye, and the second herd contained 16 pink-eye infections. The infected cattle were each administered subcutaneously with 35 ml of the antiserum. Within 3-5 days after the injections all of the cattle showed improvement, and within 7 days all had recovered completely.

The bacterin was prepared as described earlier and field-tested by application to two large herds, each in excess of 100 head of cattle. In each, no cases of pink-eye have occurred in those treated and no side effects have been observed.

It is to be understood that the foregoing detailed description is given by way of illustration of preferred forms of antiserum and bacterin as well as the methods of preparing same and that variations may be made therein without departing from the spirit and scope of this invention.

What is claimed is:

1. An antiserum for the treatment of infectious keratitis in animals which comprises the serum from the defibrinated blood of cattle which have been successively immunized and hyperimmunized against strains of *Moraxella bovis*, *Corynebacterium* and *Pasteurella multocida*.

2. The antiserum according to claim 1 wherein the *Pasteurella multocida* bacteria strains are *Pasteurella bubalseptica*, *Pasteurella bouiseptica* and *Pasteurella oviseptica*.

3. An antiserum for the treatment and prevention of infectious keratitis in animals which comprises the serum from the defibrinated blood of cattle which have been successively immunized and hyperimmunized against strains of *Moraxella bovis*, *Corynebacterium* and *Pasteurella multocida*, the titer of said serum being effective when:

a. 0.005 ml of serum injected subcutaneously in white mice weighing from about 18 to about 20 grams protects 50 percent of said mice for about 168 hours against the injection subcutaneously of 0.5 ml of fresh and virulent *Pastuerella multocida* culture having a concentration of 0.001 ppm 24 hours after the injection of said serum, and b. the subcutaneous injection of 0.5 ml of fresh and virulent *Pasteurella multocida* culture having a concentration of 0.001 ppm in the absence of said serum kills substantially all of the control white mice weighing from about 18 to about 20 grams within 72 hours.

4. A method of preparing an antiserum for the use in the treatment and prevention of infectious keratitis which comprises:

a. immunizing cattle through subcutaneous injection with an inactivated pooled culture composition comprising:
   i. 65 volume percent *Pasteurella multocida* bacteria strains selected from the group consisting of *Pasteurella bubalseptica*, *Pasteurella boviseptica* and *Pasteurella oviseptica*, admixed in approximately equal portions;
   ii. 25 volume percent *Corynebacteria* selected from the group consisting of *Corynebacterium pyogenes*, *Corynebacterium pseudotuberculosis* and *Corynebacterium pseudodiphthericum* admixed in approximately equal portions; and
   iii. 10 volume percent *Moraxella bovis* bacteria, said injections being administered at 3 to 7 day intervals utilizing increasingly larger dosages which vary from an initial dosage of 20 ml to a final dosage of 100 ml; and b. hyperimmunizing said cattle through a separate, remote subcutaneous injection of:
   i. 50 ml of *Corynebacterium Pasteurella antiserum*, and
   ii. live, virulent pooled cultures having the composition set forth in (a) above; and c. withdrawing blood containing said antiserum from said cattle.

5. The method according to claim 2 wherein the *Pasteurella multocida* bacteria strains are *Pasteurella bubalseptica*, *Pasteurella boviseptica* and *Pasteurella oviseptica*.

6. The method according to claim 2 wherein said cattle are hyperimmunized through a succession of remote subcutaneous injections of live, virulent pooled cultures having the composition set forth in (a) above, said hyperimmunizing injections being administered at about sevenday intervals utilizing increasingly larger dosages which vary from an initial dosage of 5 ml to a final dosage of 150 ml.

7. An immunizing agent for use in the treatment of infectious keratitis in animals comprising a culture composition made up of pooled bacteria in the following proportions:

a. 65 volume percent *Pasteurella multocida* bacteria strains selected from the group consisting of *Pasteurella bubalseptica*, *Pasteurella boviseptica* and *Pasteurella oviseptica*, admixed in approximately equal proportions;

b. 25 volume percent Corynebacteria selected from the group consisting of *Corynebacterium pyogenes*, *Corynebacterium pseudotuberculosis* and *Coryne-* bacterium pseudodiphthericum, admixed in approximately equal proportions; and c. 10 volume percent *Moraxella bovis* bacteria.

8. An immunizing agent according to claim 7 wherein the culture composition consists only of inactivated pooled cultures.

9. A bacterin for the prevention of infectious keratitis in livestock which comprises an inactivated pooled culture composition comprising:

a. 65 volume percent *Pasteurella multocida* bacteria strains selected from the group consisting of *Pasteurella bubalseptica*, *Pasteurella boviseptica* and *Pasteurella oviseptica*, admixed in approximately equal proportions;

b. 25 volume percent Corynebacteria selected from the group consisting of *Corynebacterium pyogenes*, *Corynebacterium pseudotuberculosis* and *Corynebacterium pseudodiphthericum*, admixed in approximately equal proportions; and c. 10 volume percent *Moraxella bovis* bacteria.

10. The bacterin according to claim 9 wherein the pooled culture composition is inactivated through the addition of formaldehyde to a final concentration of from about 0.3 to 0.5 volume percent formaldehyde.

11. A bacterin for long term preventive inocculation of animals against infectious keratitis which comprises an inactivated pooled culture composition comprising *Moraxella bovis*, and selected strains of *Pasteurella multocida* and Corynebacteria.

12. A bacterial vaccine for long term preventive inocculation of livestock against infectious keratitis which comprises an inactivated pooled culture composition compound of *Moraxella bovis*, *Pasteurella multocida* bacteria strain selected from the group consisting of *Pasteurella bubalseptica*, *Pasteurella boviseptica* and *Pasteurella oviseptica*, and *Corynebacteria strain* selected from the group consisting of *Corynebacterium pyrogenes*, *Corynebacterium pseudotuberclulosis*, and *Corynebacterium pseudodiphthesicum*.

13. The bacteria according to claim 12 wherein each of the *Pasteurella multocida* and Corynebacteria strains are selected in approximately equal proportions.

* * * * *

UNITED STATES PATENT OFFICE
CERTIFICATE OF CORRECTION

Patent No. 3,853,990    Dated December 10, 1974

Inventor(s) E. J. Madigan et al.

It is certified that error appears in the above-identified patent and that said Letters Patent are hereby corrected as shown below:

Column 7, line 26, after "agriculture", insert -- , --.

Column 8, line 53, cancel "seven-ay" and substitute -- seven-day --.

Column 10, line 2, after "to", insert -- about --.
line 17, cancel "pseudodiphthesicum" and substitute -- pseudodiphthericum --.
all occurrences, cancel "selected" and substitute -- admixed --.

Signed and sealed this 17th day of June 1975.

(SEAL)
Attest:

RUTH C. MASON
Attesting Officer

C. MARSHALL DANN
Commissioner of Patents
and Trademarks